US011591771B2

(12) United States Patent
Koshi et al.

(10) Patent No.: US 11,591,771 B2
(45) Date of Patent: Feb. 28, 2023

(54) WORK VEHICLE

(71) Applicant: KOMATSU LTD., Tokyo (JP)

(72) Inventors: Akihiro Koshi, Tokyo (JP); Masahiko Hamaguchi, Tokyo (JP); Hirofumi Wada, Tokyo (JP); Naoki Kimura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 17/272,684

(22) PCT Filed: Oct. 17, 2019

(86) PCT No.: PCT/JP2019/040916
§ 371 (c)(1),
(2) Date: Mar. 2, 2021

(87) PCT Pub. No.: WO2020/085196
PCT Pub. Date: Apr. 30, 2020

(65) Prior Publication Data
US 2021/0340727 A1    Nov. 4, 2021

(30) Foreign Application Priority Data

Oct. 26, 2018   (JP) .............................. JP2018-202134

(51) Int. Cl.
*E02F 9/20* (2006.01)
*B60N 2/75* (2018.01)
*E02F 9/16* (2006.01)

(52) U.S. Cl.
CPC ............ *E02F 9/2004* (2013.01); *B60N 2/797* (2018.02); *E02F 9/16* (2013.01)

(58) Field of Classification Search
CPC .......... B60N 2/77; B60N 2/767; B60N 2/797; B60N 2/38; B60N 2002/022; E02F 9/2004; E02F 9/16; E02F 9/166
See application file for complete search history.

(56) References Cited

U.S. PATENT DOCUMENTS

| 1,706,634 | A | * | 3/1929 | Seils | ......................... | G05G 1/62 |
| | | | | | | 297/411.22 |
| 3,223,193 | A | * | 12/1965 | Reynolds | ................. | B62D 1/22 |
| | | | | | | 180/329 |
| 3,369,682 | A | * | 2/1968 | Breault | ..................... | B62D 1/22 |
| | | | | | | 414/459 |

(Continued)

FOREIGN PATENT DOCUMENTS

| CN | 1795114 A | 6/2006 |
| CN | 105083076 A | 11/2015 |

(Continued)

*Primary Examiner* — Paul N Dickson
*Assistant Examiner* — Timothy Wilhelm
(74) *Attorney, Agent, or Firm* — Faegre Drinker Biddle & Reath LLP

(57) ABSTRACT

A wheel loader representing a work vehicle includes an operator's seat, a console, and an armrest. The console includes an operation portion. The console is provided lateral to the operator's seat. The armrest includes an upper surface. The armrest is provided lateral to the operator's seat and in the rear of the operation portion. The armrest operates independently of the console such that a rear end of the upper surface is laterally displaced in a top view.

4 Claims, 15 Drawing Sheets

(56) References Cited

U.S. PATENT DOCUMENTS

| | | | | |
|---|---|---|---|---|
| 3,893,728 A * | 7/1975 | Holopainen | E02F 9/166 | 296/65.07 |
| 4,012,014 A * | 3/1977 | Marshall | B64C 13/0421 | 244/234 |
| 4,026,379 A * | 5/1977 | Dunn | B60N 2/143 | 180/331 |
| 4,478,308 A * | 10/1984 | Klaassen | G05G 1/62 | 180/326 |
| 4,496,190 A * | 1/1985 | Barley | B60N 2/767 | 297/411.38 |
| 4,674,798 A * | 6/1987 | Oeth | B60N 2/77 | 297/411.36 |
| 4,702,520 A * | 10/1987 | Whisler | B60N 2/767 | 297/411.36 |
| 4,730,691 A * | 3/1988 | Grigg | B60N 2/767 | 180/329 |
| 4,822,103 A * | 4/1989 | Stenvall | A47C 7/54 | 297/411.35 |
| 4,869,337 A * | 9/1989 | Wagner | B60N 2/143 | 180/330 |
| 4,895,040 A * | 1/1990 | Soederberg | G05G 1/52 | 74/491 |
| 4,934,462 A * | 6/1990 | Tatara | F15B 21/08 | 172/2 |
| 4,997,054 A * | 3/1991 | Denny | G05G 1/62 | 180/331 |
| 5,052,512 A * | 10/1991 | Pakosh | B62D 1/22 | 180/329 |
| 5,086,869 A * | 2/1992 | Newbery | B60K 23/00 | 180/329 |
| 5,092,408 A * | 3/1992 | Tatara | F15B 21/08 | 172/2 |
| 5,120,187 A * | 6/1992 | Weber | G05G 11/00 | 172/432 |
| 5,320,317 A * | 6/1994 | Hyatt | A47B 21/0371 | 248/118.1 |
| 5,379,663 A * | 1/1995 | Hara | B25J 13/02 | 345/161 |
| 5,566,778 A * | 10/1996 | Valier | B60K 20/02 | 180/334 |
| 5,597,207 A * | 1/1997 | Bergsten | A47C 1/03 | 297/411.35 |
| 5,651,586 A | 7/1997 | Groth | | |
| 6,226,902 B1 * | 5/2001 | Heyne | E02F 9/2004 | 37/348 |
| 6,283,504 B1 * | 9/2001 | Stanley | B60N 2/002 | 180/272 |
| 6,540,300 B2 * | 4/2003 | Piretti | A47C 1/03 | 297/411.35 |
| 6,634,453 B2 * | 10/2003 | Arthur | B60N 2/797 | 180/315 |
| 6,643,577 B1 * | 11/2003 | Padgett | E02F 9/166 | 172/2 |
| 6,736,357 B2 * | 5/2004 | Venn | F16H 59/0278 | 248/118 |
| 6,851,495 B2 * | 2/2005 | Sprinkle | F16H 61/47 | 180/336 |
| 6,971,194 B2 * | 12/2005 | McClelland | E02F 9/2004 | 172/431 |
| 6,971,471 B2 * | 12/2005 | Baker | B60T 1/065 | 180/329 |
| 7,032,703 B2 * | 4/2006 | Wulfert | B60N 2/143 | 180/329 |
| 7,036,248 B2 * | 5/2006 | Meyeres | E02F 9/2004 | 172/2 |
| 7,059,680 B2 * | 6/2006 | Billger | B60N 2/0224 | 297/344.22 |
| 7,210,552 B2 * | 5/2007 | Priepke | B62D 1/10 | 180/321 |
| 7,283,903 B2 * | 10/2007 | Merten | E02F 9/166 | 172/4.5 |
| 7,290,635 B2 * | 11/2007 | Bisick | B60N 2/797 | 180/272 |
| 7,347,299 B2 * | 3/2008 | Billger | B60N 2/002 | 180/326 |
| 7,438,318 B2 * | 10/2008 | Sano | B66F 9/07545 | 280/756 |
| 7,438,517 B2 * | 10/2008 | Tanaka | A01B 63/1013 | 180/315 |
| 7,452,032 B1 * | 11/2008 | Roleder | A61G 15/12 | 297/330 |
| 7,458,439 B2 * | 12/2008 | Catton | B60N 2/767 | 180/334 |
| 7,520,567 B2 * | 4/2009 | Billger | A47C 3/18 | 297/344.22 |
| 7,600,819 B2 * | 10/2009 | Armo | B60N 2/767 | 297/411.35 |
| 7,681,686 B1 * | 3/2010 | Klas | B60K 26/00 | 180/331 |
| 7,721,840 B2 * | 5/2010 | McCord | E02F 9/2004 | 180/336 |
| 7,757,806 B2 * | 7/2010 | Bower | E02F 9/166 | 180/326 |
| 7,784,581 B1 * | 8/2010 | Kias | G05G 9/047 | 180/329 |
| 7,857,090 B2 * | 12/2010 | Ruhter | E02F 9/16 | 180/333 |
| 7,878,288 B2 * | 2/2011 | Kostak | B60N 2/753 | 180/331 |
| 7,899,597 B2 * | 3/2011 | Vitale | E02F 9/2095 | 701/50 |
| 7,954,592 B2 * | 6/2011 | Miyazaki | E02F 9/2203 | 180/321 |
| 7,971,677 B2 * | 7/2011 | Ekren | B60N 2/24 | 180/329 |
| 8,041,485 B2 * | 10/2011 | Prasetiawan | E02F 9/2004 | 701/50 |
| 8,052,097 B2 * | 11/2011 | Rollet | B64C 27/56 | 244/229 |
| 8,104,566 B2 * | 1/2012 | Harber | B60N 2/753 | 180/315 |
| 8,714,049 B2 * | 5/2014 | Ast | G05G 1/04 | 74/522 |
| 8,714,504 B2 * | 5/2014 | Vuorenoja | A61G 3/0272 | 248/285.1 |
| 8,763,747 B2 * | 7/2014 | Jones | B60N 2/753 | 180/329 |
| 8,851,225 B2 * | 10/2014 | Braun | E02F 9/2004 | 180/324 |
| 8,979,175 B2 * | 3/2015 | Kim | B62D 33/073 | 296/190.04 |
| 9,217,240 B2 * | 12/2015 | Shibata | E02F 9/166 | |
| 9,592,758 B2 * | 3/2017 | Mahler | B60N 2/797 | |
| 9,707,865 B1 * | 7/2017 | Buerkle | B60N 2/787 | |
| 9,816,251 B2 * | 11/2017 | Sasakawa | E02F 3/7609 | |
| 9,885,170 B2 * | 2/2018 | Katayanagi | E02F 9/163 | |
| 10,144,316 B2 * | 12/2018 | Peterson | B60N 2/4242 | |
| 10,227,083 B2 * | 3/2019 | Teranishi | E02F 9/24 | |
| 10,370,821 B2 * | 8/2019 | Muramoto | E02F 9/16 | |
| 10,391,983 B2 * | 8/2019 | Klein | B60T 7/02 | |
| 10,702,069 B2 * | 7/2020 | Pelka | B60N 2/767 | |
| 10,814,746 B2 * | 10/2020 | Sailer | B60N 2/012 | |
| 10,994,778 B2 * | 5/2021 | Benck | B66C 13/20 | |
| 2002/0145325 A1 * | 10/2002 | Clevenger | B60N 2/753 | 297/411.32 |
| 2003/0184123 A1 * | 10/2003 | Amamiya | B66F 9/0759 | 296/190.01 |
| 2006/0000656 A1 * | 1/2006 | Bisick | B60N 2/753 | 180/272 |
| 2008/0277190 A1 * | 11/2008 | McCord | E02F 9/2004 | 180/444 |
| 2015/0360593 A1 * | 12/2015 | Mahler | B60N 2/767 | 297/411.32 |

(56) References Cited

U.S. PATENT DOCUMENTS

2021/0261205 A1\*  8/2021  McConoughey ........ B60N 2/77
2021/0261206 A1\*  8/2021  McConoughey ........ B60N 2/68

FOREIGN PATENT DOCUMENTS

| | | |
|---|---|---|
| DE | 102010015639 A1 | 10/2011 |
| JP | H06-035356 U | 5/1994 |
| JP | H09-313300 A | 12/1997 |
| JP | H10-280481 A | 10/1998 |
| JP | 2001-322467 A | 11/2001 |
| JP | 2002-187487 A | 7/2002 |
| JP | 2012-200473 A | 10/2012 |
| JP | 2013-233165 A | 11/2013 |
| JP | 2017-104209 A | 6/2017 |
| KR | 10-0826628 B1 | 5/2008 |

\* cited by examiner

WORK VEHICLE

TECHNICAL FIELD

The present disclosure relates to a work vehicle.

BACKGROUND ART

For example, US Publication No. 2006/0000656 (PTL 1) discloses a work machine including a seat, an operation controller such as a joy stick provided lateral to the seat, and an arm support provided lateral to the seat.

CITATION LIST

Patent Literature

PTL 1: US Publication No. 2006/0000656

SUMMARY OF INVENTION

Technical Problem

As disclosed in PTL 1, a work vehicle including an armrest lateral to an operator's seat has been known. An operator sits in the operator's seat and operates an operation portion for controlling various operations of the work vehicle. At this time, the armrest is used as a support for an operator's elbow. Operators, however, are various in physical build. Therefore, when an operator attempts to operate the operation portion with his/her elbow resting on the armrest, it may be difficult for the operator to take a comfortable operation posture.

An object of the present disclosure is to provide a work vehicle in which an operator can take a comfortable operation posture regardless of physical build of the operator.

Solution to Problem

A work vehicle according to the present disclosure includes an operator's seat, a console, and an armrest. The console includes an operation portion. The console is provided lateral to the operator's seat. The armrest includes an upper surface. The armrest is provided lateral to the operator's seat and in the rear of the operation portion. The armrest operates independently of the console such that a rear end of the upper surface is laterally displaced in a top view.

Advantageous Effects of Invention

According to the present disclosure, a work vehicle in which an operator can take a comfortable operation posture regardless of physical build of the operator can be provided.

DESCRIPTION OF EMBODIMENTS

Figure 1:
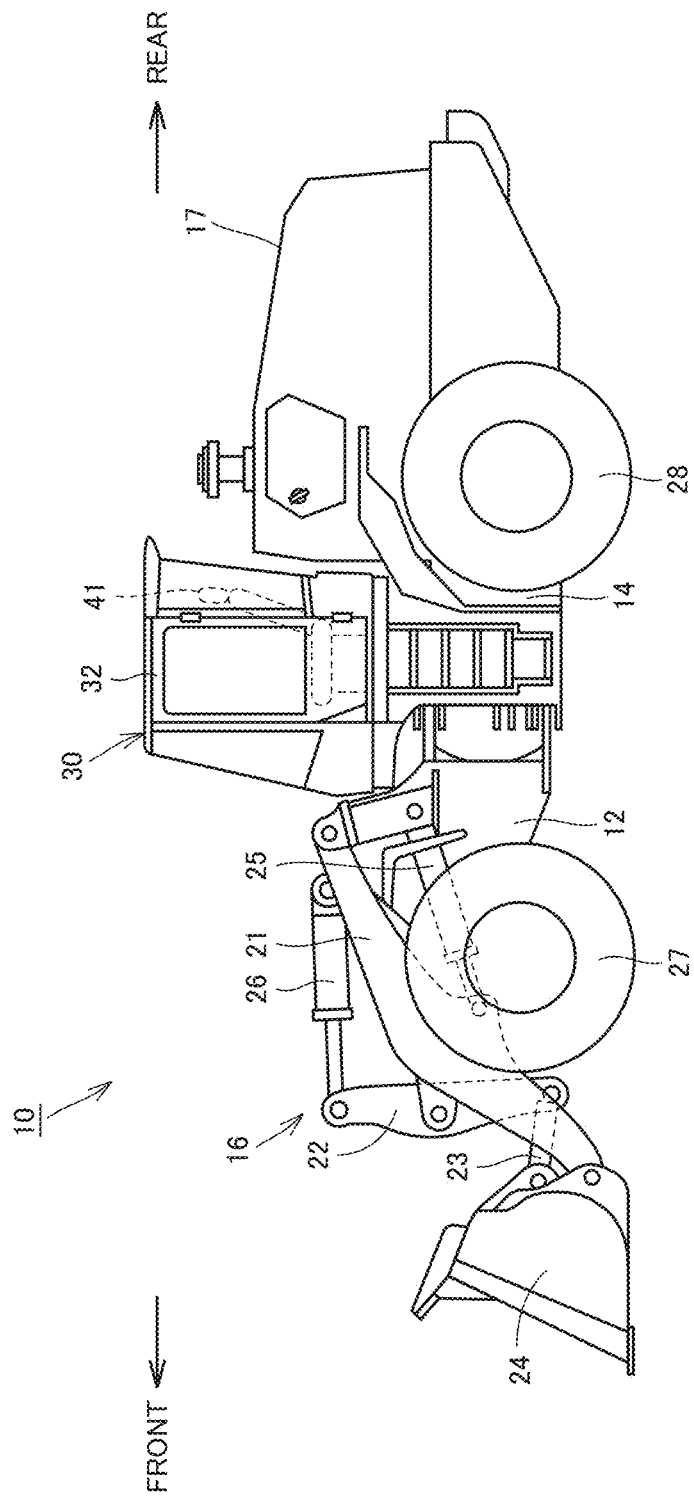
FIG. 1 is a side view showing a wheel loader in an embodiment of the present disclosure.

An embodiment of the present disclosure will be described with reference to the drawings. The same or corresponding members in the drawings referred to below have the same reference characters allotted.

FIG. 1 is a side view showing a wheel loader in an embodiment of the present disclosure. A general structure of a wheel loader 10 in the present embodiment will initially be described.

As shown in FIG. 1, wheel loader 10 includes a front frame 12, a rear frame 14, a front wheel 27, a rear wheel 28, a work implement 16, a cab (an operator's cab) 30, an operator's seat 41, and an engine hood 17.

In the description below, a fore/aft direction refers to a fore/aft direction of an operator who sits in an operator's seat 41 in cab 30. A direction in which the operator sitting in operator's seat 41 faces is defined as the fore direction and a direction behind the operator sitting in operator's seat 41 is defined as the aft direction. A lateral (side) direction refers to a lateral direction of the operator who sits in operator's seat 41. A right side and a left side at the time when the operator sitting in operator's seat 41 faces front are defined as the right direction and the left direction, respectively. An upward/downward direction is a direction orthogonal to the plane including the fore/aft direction and the lateral direction. A side where the ground is located is defined as a lower side and a side where the sky is located is defined as an upper side.

Front frame 12 and rear frame 14 form a vehicular body frame of an articulated structure. Front frame 12 is provided in front of rear frame 14. Front frame 12 is pivotably connected to rear frame 14 by a central pin (not shown). An axis that extends in the upward/downward direction is defined as a pivot center of front frame 12 with respect to rear frame 14.

Front frame 12 and rear frame 14 are coupled to each other by a steering cylinder (not shown). A pair of left and right steering cylinders is provided. As the steering cylinder is driven to extend and contract, front frame 12 pivots laterally around the central pin.

Front wheel 27 and rear wheel 28 are running wheels of wheel loader 10. Front wheel 27 is provided in front frame 12. A pair of left and right front wheels 27 is provided. Rear wheel 28 is provided in rear frame 14. A pair of left and right rear wheels 28 is provided.

Work implement 16 is provided in front frame 12. Work implement 16 includes a boom 21, a bucket 24, a boom cylinder 25, a bell crank 22, a bucket cylinder 26, and a link 23.

Cab 30 and engine hood 17 are provided in rear frame 14. Cab 30 is provided in the rear of work implement 16. Engine hood 17 is provided in the rear of cab 30. Engine hood 17 accommodates a hydraulic oil tank, an engine, a hydraulic pump, an air cleaner, and the like.

Cab 30 delimits an indoor space which an operator enters. A door 32 is provided in a side surface of cab 30. Door 32 is opened and closed when the operator enters or goes out of cab 30. Operator's seat 41 is provided in the indoor space delimited by cab 30. The operator sits in operator's seat 41 in cab 30 and operates wheel loader 10. The present disclosure is applicable also to a cab-less work vehicle where the operator's seat is provided in an outdoor space.

Figure 2:
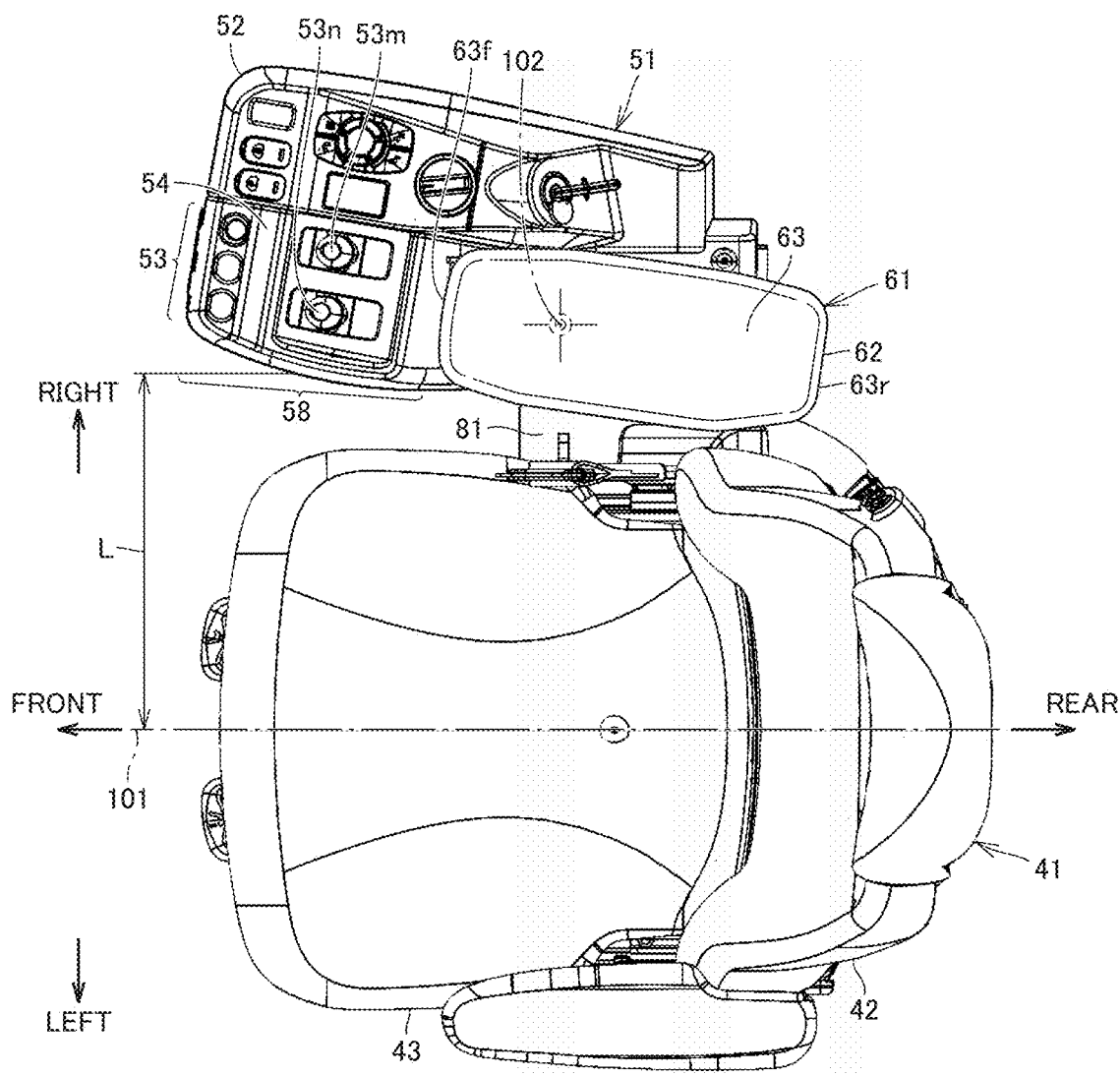
FIG. 2 is a top view showing a structure around an operator's seat in a cab in FIG. 1.
Figure 3:
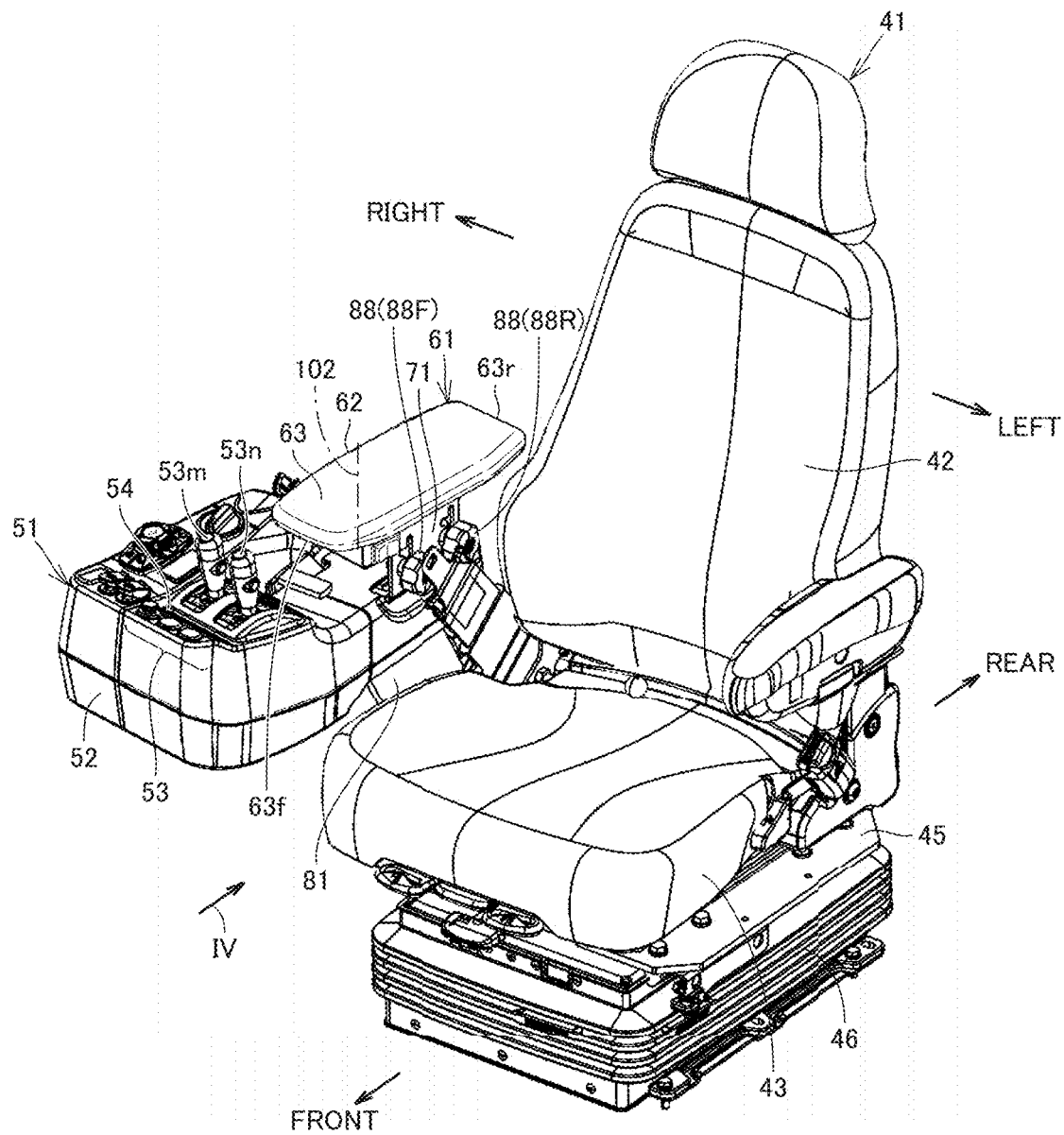
FIG. 3 is a perspective view showing the structure around the operator's seat in the cab in FIG. 1.
Figure 4:
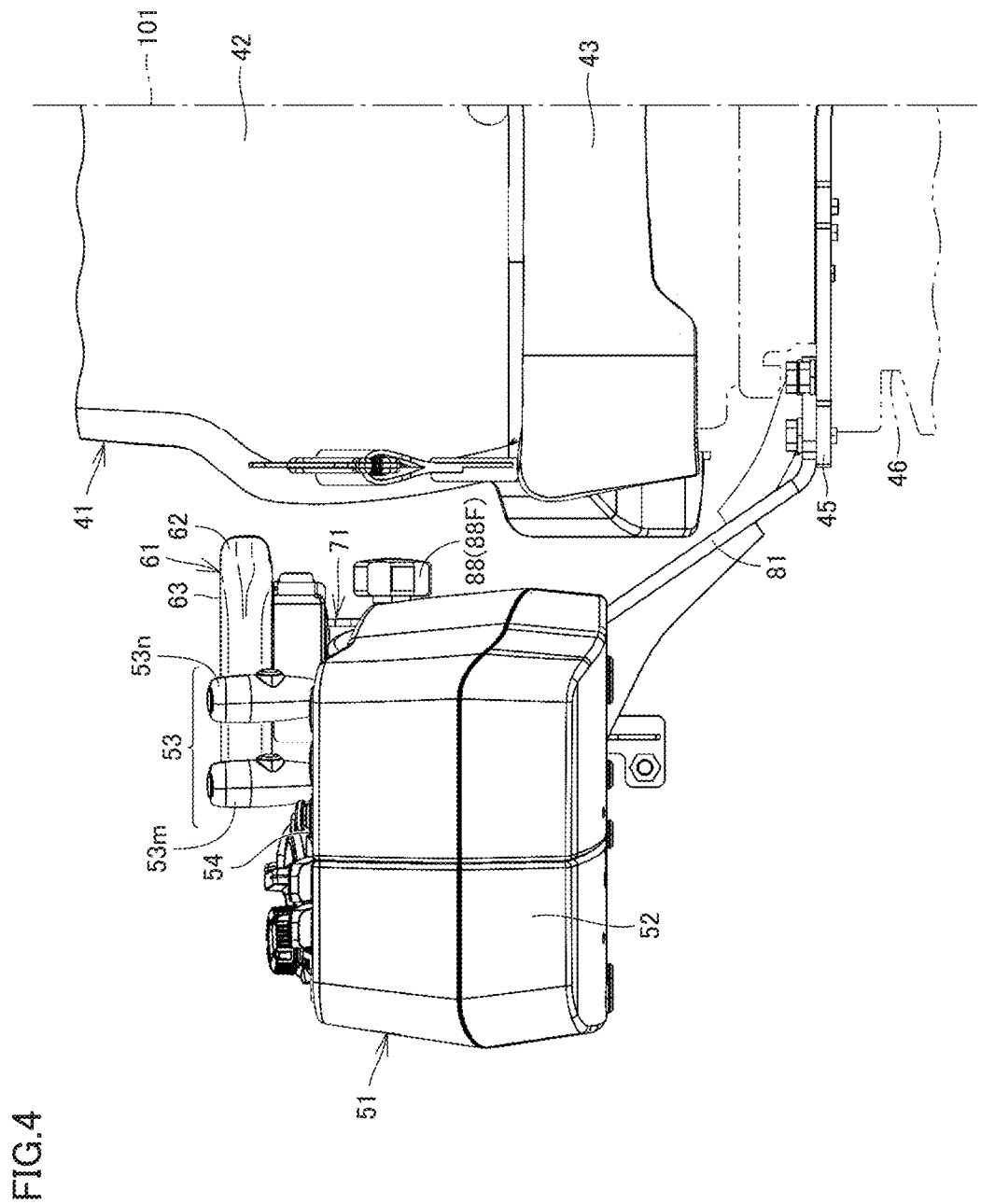
FIG. 4 is a front view showing the structure around the operator's seat when viewed in a direction shown with an arrow IV in FIG. 3.

FIG. 2 is a top view showing a structure around the operator's seat in the cab in FIG. 1. FIG. 3 is a perspective view showing the structure around the operator's seat in the cab in FIG. 1. FIG. 4 is a front view showing the structure around the operator's seat when viewed in a direction shown with an arrow IV in FIG. 3.

As shown in FIGS. 2 to 4, operator's seat 41 includes a seat cushion 43 and a seat back 42. Seat cushion 43 is a seat part in which an operator sits down. Seat back 42 is provided to rise upward from a rear end of seat cushion 43. Seat back 42 is a seat part serving as a backrest for an operator.

Wheel loader 10 further includes a support plate 45 and a suspension mechanism 46.

Support plate 45 is provided below seat cushion 43. Support plate 45 is in a shape of a flat plate and provided in parallel to a horizontal direction. Support plate 45 is provided as a support member that supports on a side of operator's seat 41, a console 51 and an armrest 61 which will be described later.

Suspension mechanism 46 is provided below seat cushion 43. Operator's seat 41 is attached to a floor surface of cab 30 with suspension mechanism 46 being interposed. Suspension mechanism 46 elastically supports operator's seat 41.

Figure 5:
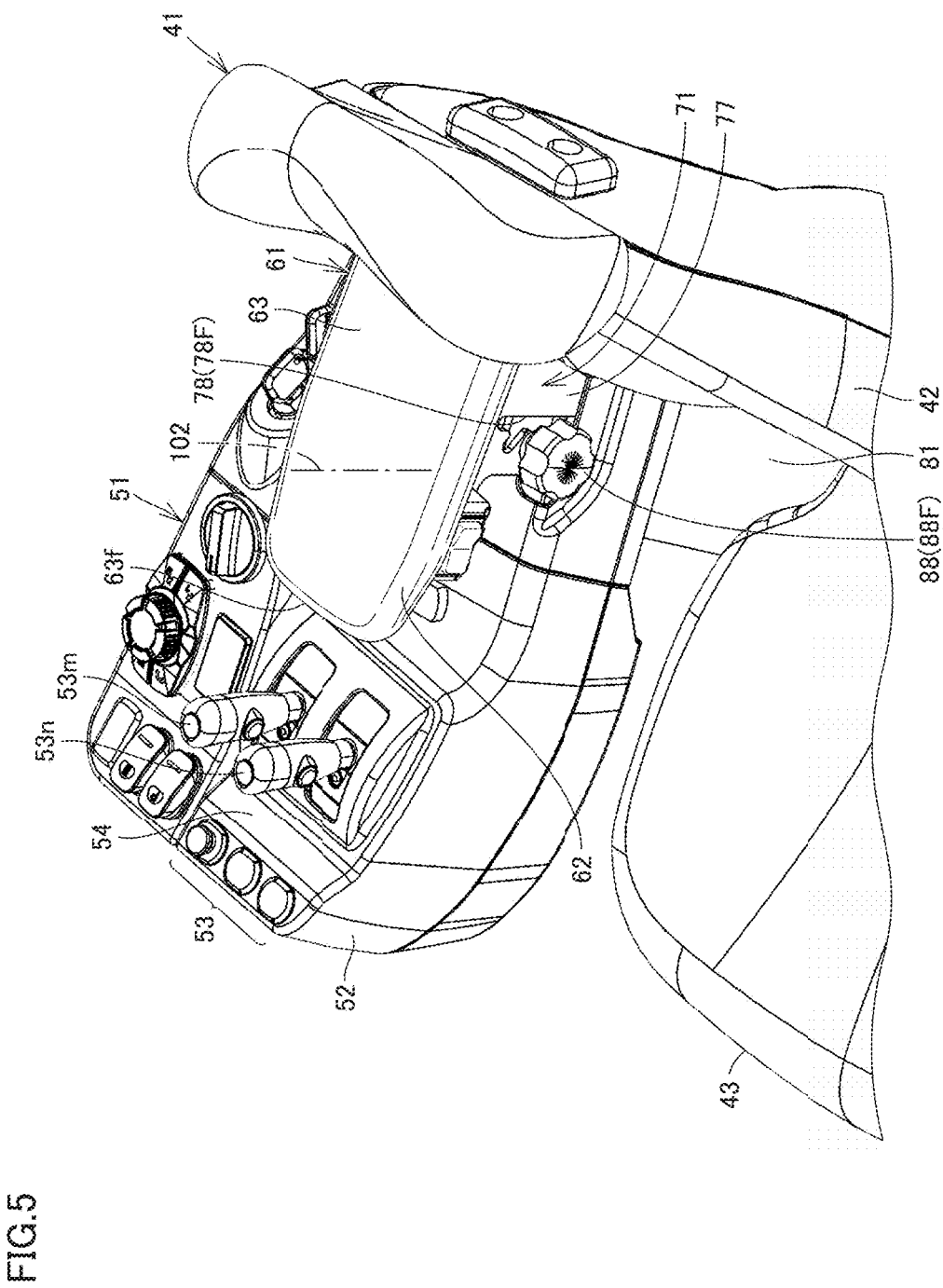
FIG. 5 is a perspective view showing a console and an armrest in a field of view of an operator who sits in the operator's seat.

In succession, a structure of console 51 and armrest 61 provided around operator's seat 41 will be described. FIG. 5 is a perspective view showing the console and the armrest in a field of view of an operator who sits in the operator's seat.

As shown in FIGS. 2 to 5, wheel loader 10 further includes console 51. Console 51 is provided lateral to operator's seat 41. Console 51 is provided on the right side of operator's seat 41.

Console 51 includes a housing portion 52 and an operation portion 53. Housing portion 52 is in a shape of a housing and defines an appearance of console 51. Housing portion 52 and seat cushion 43 are laterally aligned. Housing portion 52 is aligned at a distance from seat cushion 43 in the lateral direction.

Housing portion 52 includes an upper surface 54. Upper surface 54 is located above seat cushion 43. Upper surface 54 is in such an elongated shape that the fore/aft direction is defined as a longitudinal direction and the lateral direction is defined as a short-side direction.

Operation portion 53 is provided in housing portion 52. Operation portion 53 is provided on upper surface 54. Operation portion 53 is provided closer to a front end of upper surface 54 than to a rear end of upper surface 54 in the fore/aft direction. Operation portion 53 is operated by an operator to control an operation of wheel loader 10.

Operation portion 53 is provided in a left area of upper surface 54. Operation portion 53 is provided in an area of upper surface 54 close to operator's seat 41 in the lateral direction. In a right area of upper surface 54, various operation portions such as a switch and a dial to be used in operating wheel loader 10 are further provided.

Among a plurality of operation portions provided in console 51, operation portion 53 is relatively high in frequency of use by the operator. Operation portion 53 representatively includes control levers 53$m$ and 53$n$ for controlling an operation of work implement 16 (boom 21 and bucket 24). Control levers 53$m$ and 53$n$ are provided as being slidable in the fore/aft direction.

As shown in FIG. 2, console 51 includes a front portion 58. Front portion 58 is a part of housing portion 52 and in a shape of a housing. Operation portion 53 is provided in front portion 58 of housing portion 52. Front portion 58 is provided in front of armrest 61 which will be described later.

FIG. 2 shows a centerline 101 of operator's seat 41 that extends in the fore/aft direction. Front portion 58 is provided such that a lateral distance L from centerline 101 of operator's seat 41 to front portion 58 in a top view increases from the rear toward the front. In the top view, front portion 58 extends diagonally with respect to the fore/aft direction. Seat cushion 43 has a front end located lateral to front portion 58.

A direction of slide of control levers 53$m$ and 53$n$ is set to a diagonal direction with respect to the fore/aft direction, in correspondence with inclination of front portion 58. An angle formed between the direction of slide of control levers 53$m$ and 53$n$ and the fore/aft direction (centerline 101 of operator's seat 41) is within a range, for example, not smaller than 5° and not greater than 15°.

As shown in FIGS. 2 to 5, wheel loader 10 further includes armrest 61. Armrest 61 is provided lateral to operator's seat 41. Armrest 61 is provided on the right side of operator's seat 41.

Armrest 61 is used as a support for an operator's elbow. Armrest 61 is provided above console 51 (housing portion 52). Armrest 61 is provided at a position where at least a part of armrest 61 is projected on upper surface 54 of housing portion 52 in the top view. Armrest 61 is provided in the rear of operation portion 53 (control levers 53$m$ and 53$n$). Armrest 61 is provided at a position distant rearward from operation portion 53.

Armrest 61 includes an upper surface 63. Upper surface 63 is provided in parallel to the horizontal direction. Upper surface 63 serves as an elbow support surface on which the elbow of the operator is placed. Upper surface 63 is located above seat cushion 43. Upper surface 63 is located above upper surface 54 of housing portion 52. Upper surface 63 is in such an elongated shape that the fore/aft direction is defined as the longitudinal direction and the lateral direction is defined as the short-side direction. Upper surface 63 is in such a substantially rectangular shape that the fore/aft direction is defined as the longitudinal direction and the lateral direction is defined as the short-side direction.

Upper surface 63 includes a front end 63$f$ and a rear end 63$r$. Front end 63$f$ is located at the front end of upper surface 63. Among four sides of upper surface 63 in the substantially rectangular shape, front end 63$f$ corresponds to a short side located on a front side. Rear end 63$r$ is located at the rear end of upper surface 63. Among the four sides of upper surface 63 in the substantially rectangular shape, rear end 63r corresponds to a short side located on a rear side.

As shown in FIG. 2, front end 63f is located lateral to seat cushion 43 in the top view. Rear end 63r is located lateral to seat back 42 in the top view.

Figure 6:
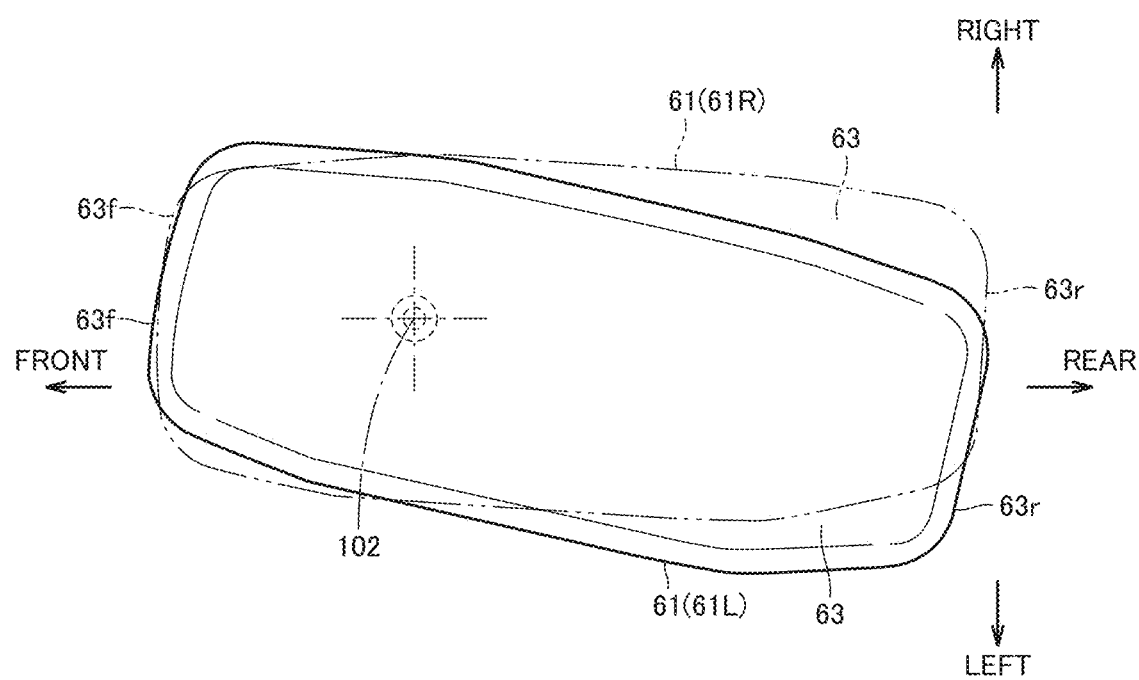
FIG. 6 is a top view showing an operation of the armrest.

FIG. 6 is a top view showing an operation of the armrest. As shown in FIGS. 3 and 6, armrest 61 operates independently of console 51 such that rear end 63r of upper surface 63 is laterally displaced in the top view. Armrest 61 can operate such that rear end 63r of upper surface 63 is laterally displaced in the top view while console 51 is resting.

Armrest 61 pivots around a pivot central axis 102. Pivot central axis 102 intersects with upper surface 63. Pivot central axis 102 is orthogonal to upper surface 63. Pivot central axis 102 is a virtual straight line that extends in a vertical direction.

Pivot central axis 102 is located between rear end 63r of upper surface 63 and front end 63f of upper surface 63 in the fore/aft direction. Pivot central axis 102 is located closer to front end 63f of upper surface 63 than to rear end 63r of upper surface 63 in the fore/aft direction. A length between pivot central axis 102 and front end 63f of upper surface 63 in the fore/aft direction is shorter than a length between pivot central axis 102 and rear end 63r of upper surface 63 in the fore/aft direction.

As armrest 61 pivots within a prescribed range of angles around pivot central axis 102 in such a construction, rear end 63r of upper surface 63 is laterally displaced. Rear end 63r of upper surface 63 is laterally displaced along an arc around pivot central axis 102.

FIG. 6 shows with a solid line, armrest 61 (61L) at the time when rear end 63r of upper surface 63 is displaced to a leftmost position and shows with a chain double dotted line, armrest 61 (61R) at the time when rear end 63r of upper surface 63 is displaced to a rightmost position. A range of angles within which armrest 61 can pivot may be, for example, not smaller than 3° and not greater than 20° or not smaller than 6° and not greater than 10°.

Figure 7:
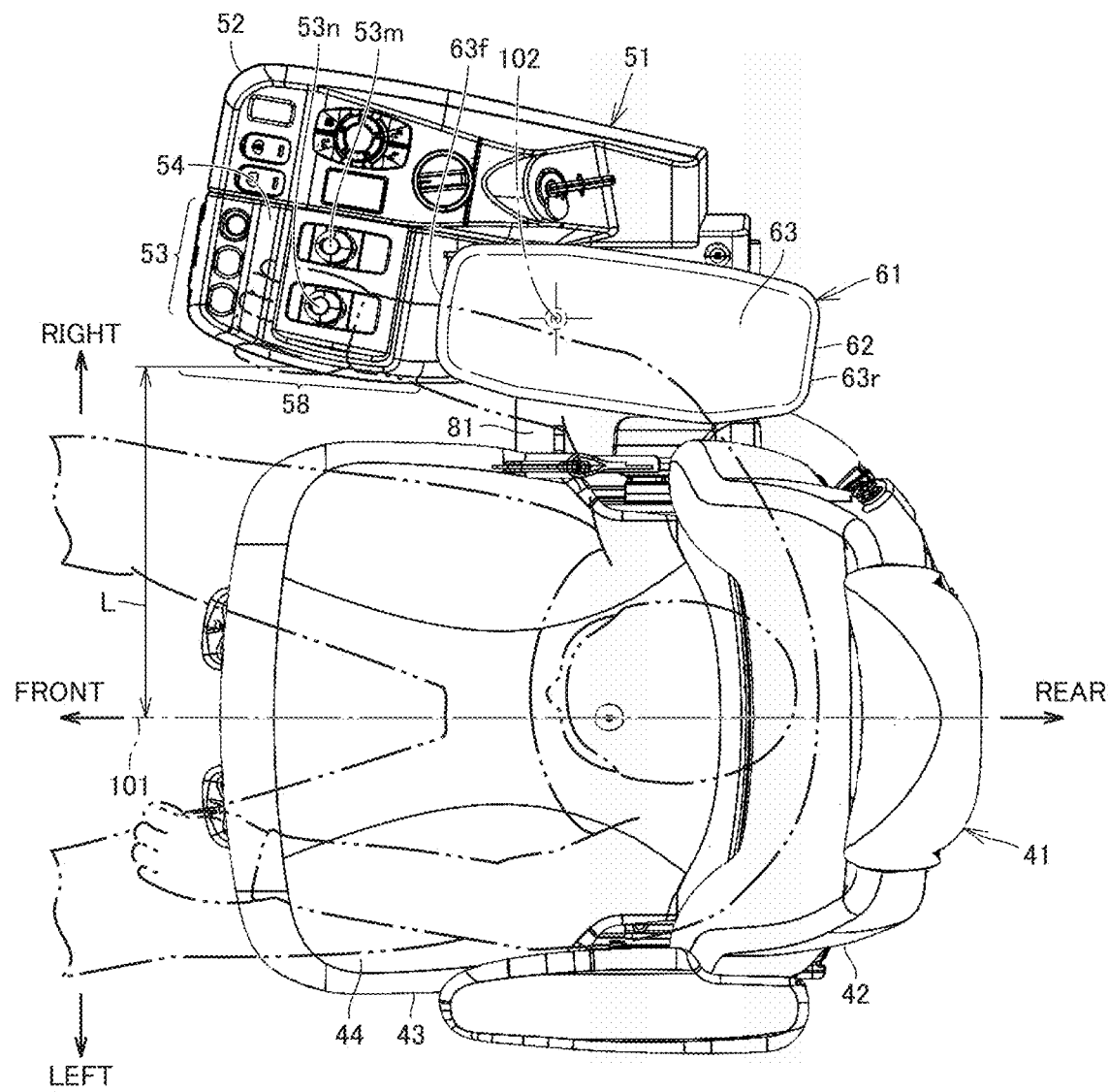
FIG. 7 is a top view showing a seated state of the operator.

FIG. 7 is a top view showing a seated state of the operator. As shown in FIG. 7, an operator who sits in operator's seat 41 operates operation portion 53 (control levers 53m and 53n) in a general operation posture with his/her elbow being placed on upper surface 63 of armrest 61. At this time, the operator's elbow is placed at a position closer toward the rear of upper surface 63 and the operator's arm extends forward from the rear side of upper surface 63 toward operation portion 53.

In wheel loader 10, armrest 61 operates such that rear end 63r of upper surface 63 is laterally displaced in the top view. According to such a construction, when the operator uses armrest 61 as the elbow support, the operator can take a comfortable operation posture regardless of his/her physical build.

More specifically, when the operator has a large shoulder width, the operator should only operate armrest 61 such that rear end 63r of upper surface 63 is displaced to the right (armrest 61R in FIG. 6). The operator can thus operate operation portion 53 with his/her elbow being placed on upper surface 63 of armrest 61 without taking such an uncomfortable posture as shrugging his/her shoulder. When the operator has a small shoulder width, the operator should only operate armrest 61 such that rear end 63r of upper surface 63 is displaced to the left (armrest 61L in FIG. 6). The operator can thus operate operation portion 53 with his/her elbow being placed on upper surface 63 of armrest 61 without extremely squaring his/her elbow.

Armrest 61 pivots around pivot central axis 102. According to such a construction, an operation mechanism of armrest 61 can be constructed in a more simplified manner than in an example where the entire armrest 61 performs a slide operation in the lateral direction.

Pivot central axis 102 is located closer to front end 63f of upper surface 63 than to rear end 63r of upper surface 63 in the fore/aft direction.

According to such a construction, when armrest 61 pivots, a length of lateral displacement of rear end 63r is longer than a length of lateral displacement of front end 63f. A larger range within which the position of rear end 63r is adjusted can thus be set. In contrast, when armrest 61 pivots, a length of lateral displacement of front end 63f is shorter than a length of lateral displacement of rear end 63r. Loss of relative positional relation between operation portion 53 and a position of the hand of the operator who operates operation portion 53 with adjustment of the position of rear end 63r in the lateral direction can thus be suppressed.

Front portion 58 of console 51 is provided such that lateral distance L from centerline 101 of operator's seat 41 to front portion 58 increases from the rear toward the front in the top view. According to such a construction, a wide space can be secured between the leg (mainly the knee) of the operator who sits in operator's seat 41 and console 51. Even though the operator is of large build, the operator can thus take a comfortable operation posture.

Pivot central axis 102 of armrest 61 may be defined as a straight line extending diagonally with respect to the vertical direction. For example, when upper surface 63 of armrest 61 is inclined at a prescribed angle with respect to the horizontal direction such that a right end side thereof is lower than a left end side, pivot central axis 102 may be defined as a straight line inclined at the prescribed angle with respect to the vertical direction, in correspondence with inclination of upper surface 63. Pivot central axis 102 is not limited to be arranged at a position closer to front end 63f of upper surface 63 but may be provided, for example, at a position at the center between front end 63f of upper surface 63 and rear end 63r of upper surface 63 in the fore/aft direction.

The operation of armrest 61 is not limited to the pivoting operation, but for example, the entire armrest 61 may perform a slide operation in the lateral direction.

Figure 8:
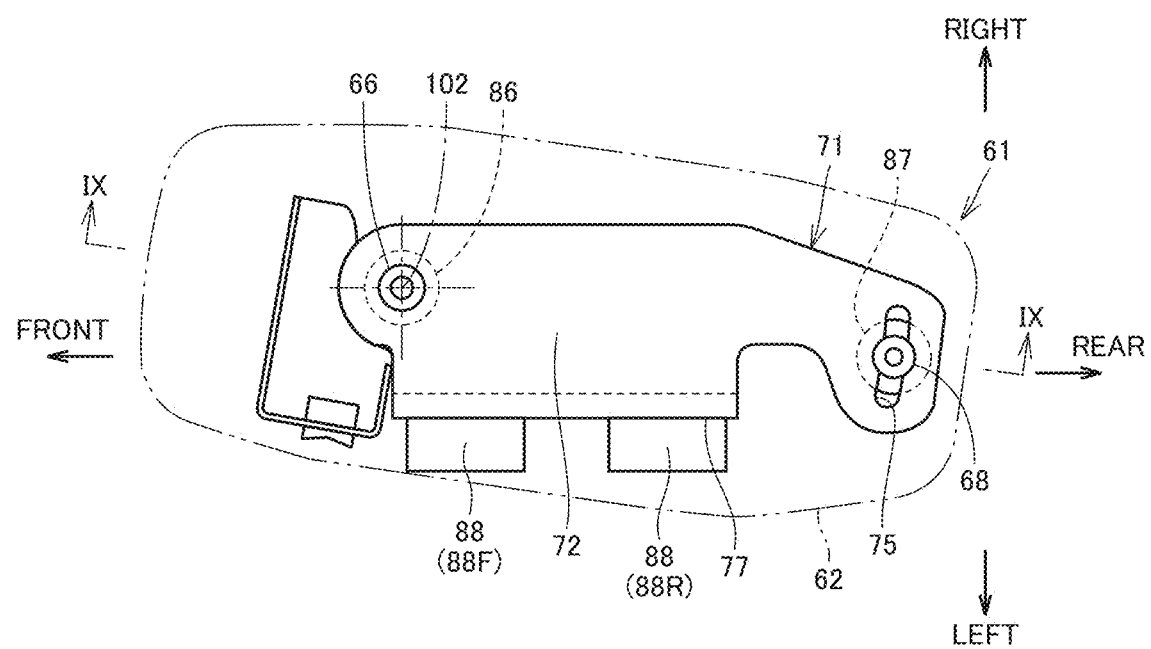
FIG. 8 is a top view showing the armrest seen through the upper surface of the armrest in FIG. 7.
Figure 9:
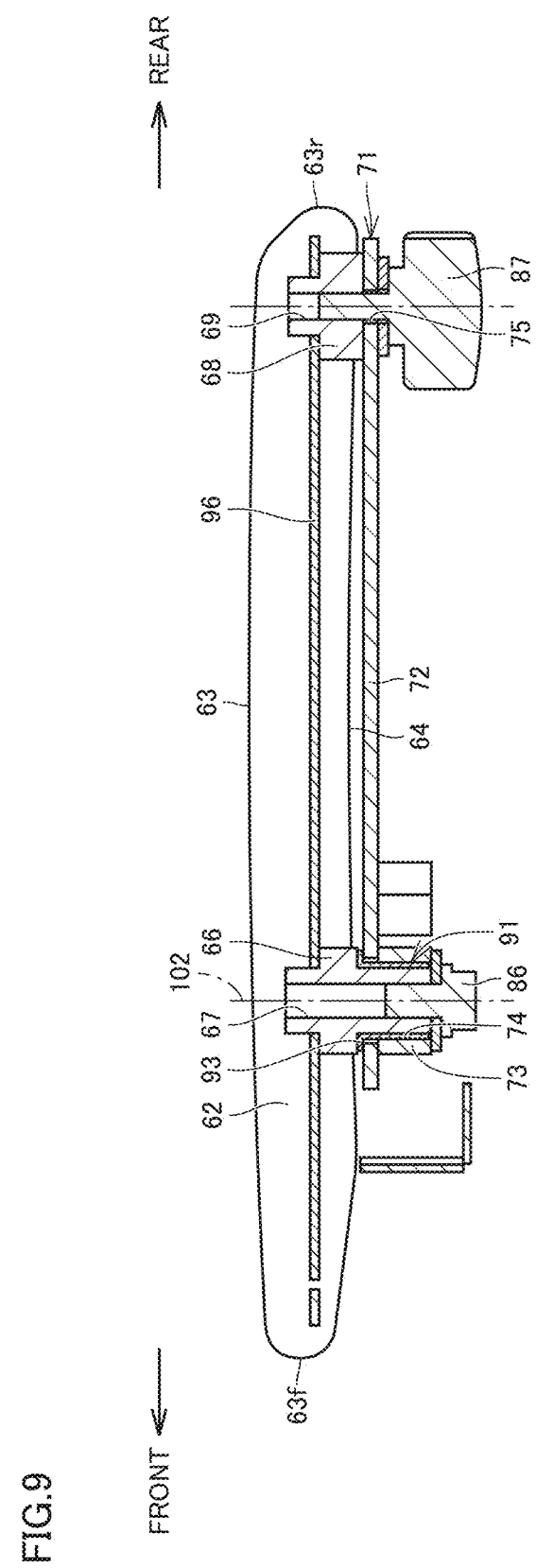
FIG. 9 is a cross-sectional view of the armrest when viewed in a direction shown with an arrow IX-IX in FIG. 8.
Figure 10:
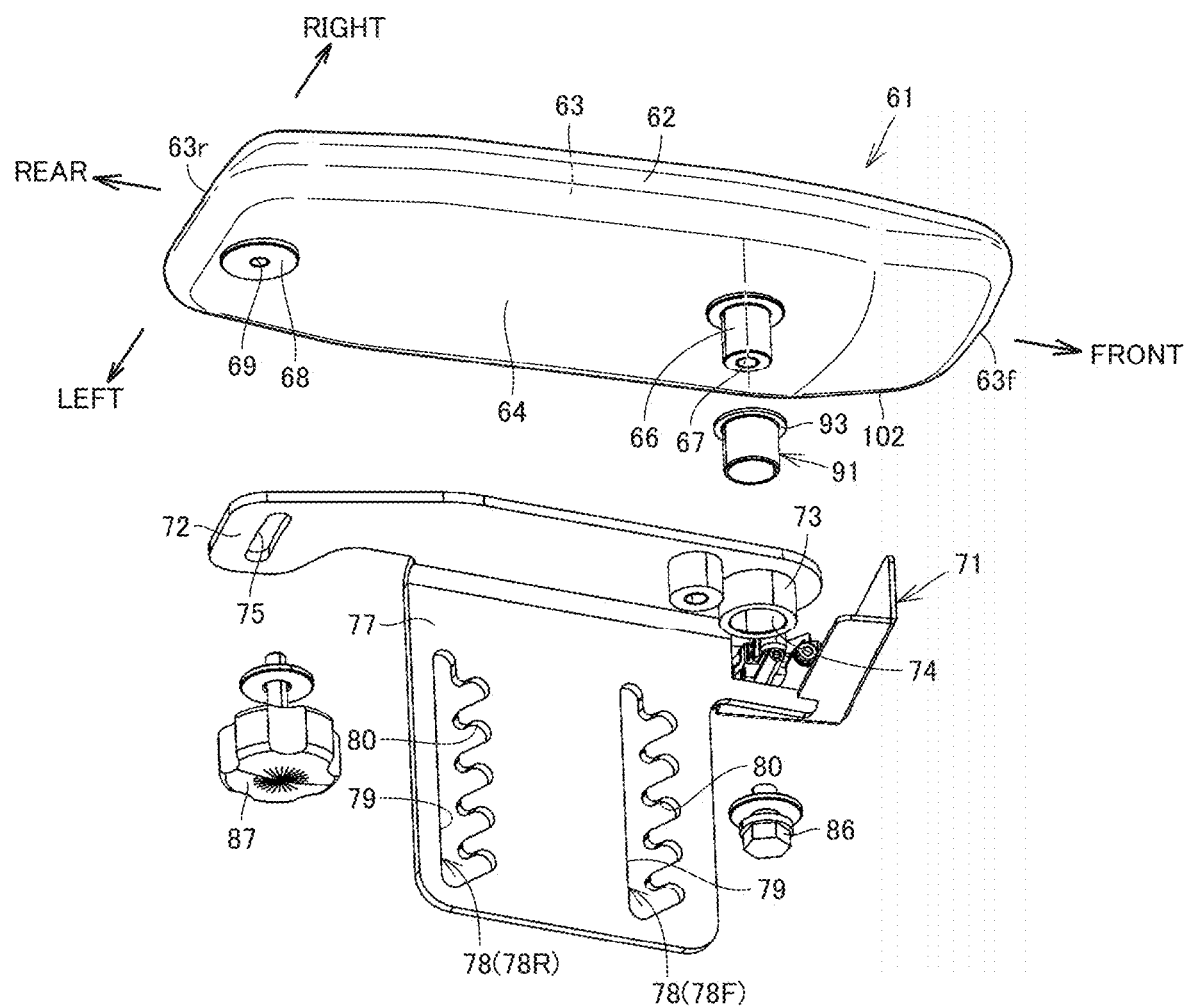
FIG. 10 is an exploded view showing the armrest.

In succession, a more specific structure of armrest 61 will be described. FIG. 8 is a top view showing the armrest seen through the upper surface of the armrest in FIG. 7. FIG. 9 is a cross-sectional view of the armrest when viewed in a direction shown with an arrow IX-IX in FIG. 8. FIG. 10 is an exploded view showing the armrest.

As shown in FIGS. 8 to 10, armrest 61 includes a cushion portion 62, a boss portion 66, a bracket 71, a collar 91, and a bolt 86.

Cushion portion 62 includes upper surface 63 and a lower surface 64. Cushion portion 62 is in a shape of a flat plate for which a direction (the upward/downward direction) of connection of upper surface 63 and lower surface 64 to each other is defined as a direction of thickness. Cushion portion 62 is formed of an elastic cushion material. Cushion portion 62 is formed, for example, of a urethane foam. Cushion portion 62 contains a metal plate 96 (see FIG. 9). Plate 96 is provided in parallel to the horizontal direction.

Boss portion 66 protrudes downward from cushion portion 62 along pivot central axis 102. Boss portion 66 is in a shape of a shaft that protrudes from lower surface 64 along pivot central axis 102. Boss portion 66 is fixed to plate 96 in cushion portion 62. A female thread 67 is provided in boss portion 66. Female thread 67 is provided along pivot central axis 102.

Bracket 71 is provided below cushion portion 62. Bracket 71 is attached to cushion portion 62.

Bracket 71 includes a lateral plate portion 72 and a vertical plate portion 77. Lateral plate portion 72 is in a shape of a flat plate and provided in parallel to the horizontal direction. In the top view, lateral plate portion 72 is in such an elongated shape that the fore/aft direction is defined as the longitudinal direction and the lateral direction is defined as the short-side direction in the top view. Lateral plate portion 72 is smaller in area in the top view than cushion portion 62 (upper surface 63). Vertical plate portion 77 is provided at a position where a side end of lateral plate portion 72 is bent. Vertical plate portion 77 is in a shape of a flat plate and provided in parallel to the vertical direction. Vertical plate portion 77 is provided along the fore/aft direction.

Bracket 71 further includes a boss fitting portion 73. Boss fitting portion 73 is provided in lateral plate portion 72. Boss fitting portion 73 protrudes downward from lateral plate portion 72. Boss fitting portion 73 is provided with hole 74. Hole 74 is provided as a through hole that passes through boss fitting portion 73 in the upward/downward direction. Hole 74 is larger in diameter than boss portion 66. Boss fitting portion 73 is in a shape of a cylinder that extends along the upward/downward direction.

Lateral plate portion 72 is provided below cushion portion 62. Lateral plate portion 72 bears a weight of cushion portion 62. Lower surface 64 of cushion portion 62 is opposed to lateral plate portion 72 with a gap lying therebetween in the upward/downward direction. Lateral plate portion 72 is arranged inside an area where upper surface 63 of cushion portion 62 is projected below. Boss portion 66 is fitted into hole 74 provided in boss fitting portion 73.

Collar 91 is in a cylindrical shape. Collar 91 is interposed between boss portion 66 and boss fitting portion 73 in a direction of radius of pivot central axis 102. Collar 91 is in slide contact with an outer circumferential surface of boss portion 66 and an inner circumferential surface of boss fitting portion 73 that defines hole 74. Boss portion 66 is fitted into hole 74 provided in boss fitting portion 73 with collar 91 being interposed. Collar 91 is formed, for example, of a resin excellent in slidability.

Collar 91 includes a flange 93. Flange 93 spreads radially outward like a brim from an upper end of collar 91 in an axial direction of pivot central axis 102. Flange 93 is interposed between lateral plate portion 72 and boss portion 66 in the axial direction of pivot central axis 102. According to such a construction, boss portion 66 is provided without being in contact with bracket 71.

Bolt 86 is screwed from below into female thread 67 provided in boss portion 66. Boss fitting portion 73 is held by bolt 86 as being integrated with boss portion 66.

As boss portion 66 is fitted into hole 74 provided in boss fitting portion 73, cushion portion 62 is supported as being pivotable around pivot central axis 102. In this case, boss portion 66 protruding from cushion portion 62 along pivot central axis 102 is constrained by boss fitting portion 73 over a prescribed range in the axial direction of pivot central axis 102. Since cushion portion 62 can thus more reliably be supported, wobbling of cushion portion 62 at the time of pivot of armrest 61 can be prevented.

As collar 91 is provided, boss portion 66 is provided without being in contact with bracket 71. According to such a construction, slide resistance produced at the time of pivot of armrest 61 can be suppressed.

Armrest 61 further includes a fastened member 68 and a lateral arrangement adjustment knob 87. Fastened member 68 protrudes downward from cushion portion 62 (lower surface 64). A length of protrusion of fastened member 68 from cushion portion 62 (lower surface 64) is shorter than a length of protrusion of boss portion 66 from cushion portion 62 (lower surface 64). Fastened member 68 is fixed to plate 96 in cushion portion 62. A female thread 69 is provided in fastened member 68. Female thread 69 is provided along the upward/downward direction.

Fastened member 68 is located between rear end 63r of upper surface 63 and front end 63f of upper surface 63 in the fore/aft direction. Fastened member 68 is provided in the rear of pivot central axis 102. Fastened member 68 is located closer to rear end 63r of upper surface 63 than to front end 63f of upper surface 63 in the fore/aft direction. A length between fastened member 68 and rear end 63r of upper surface 63 in the fore/aft direction is shorter than a length between fastened member 68 and front end 63f of upper surface 63 in the fore/aft direction.

An elongated hole 75 is provided in bracket 71. Elongated hole 75 is provided to pass through lateral plate portion 72 in a direction of thickness thereof. Elongated hole 75 is in a shape of an elongated hole that extends laterally while it maintains a constant width in the fore/aft direction. Elongated hole 75 extends like an arc around pivot central axis 102.

Lateral arrangement adjustment knob 87 is inserted from below into elongated hole 75 provided in bracket 71 and further screwed into female thread 69 provided in fastened member 68. While lateral arrangement adjustment knob 87 is unfastened, cushion portion 62 can pivot around pivot central axis 102. A position of cushion portion 62 can thus laterally be adjustable. While lateral arrangement adjustment knob 87 is tightened around fastened member 68, a pivot operation by cushion portion 62 is restricted. The adjusted position of cushion portion 62 in the lateral direction is thus fixed.

Boss portion 66 (pivot central axis 102) is provided closer to front end 63f of upper surface 63 in the fore/aft direction, whereas fastened member 68 is provided closer to rear end 63r of upper surface 63 in the fore/aft direction. According to such a construction, positions of two points where cushion portion 62 is supported by bracket 71 can greatly be distant from each other in the fore/aft direction. Therefore, cushion portion 62 can be supported in a more stable manner.

Figure 11:
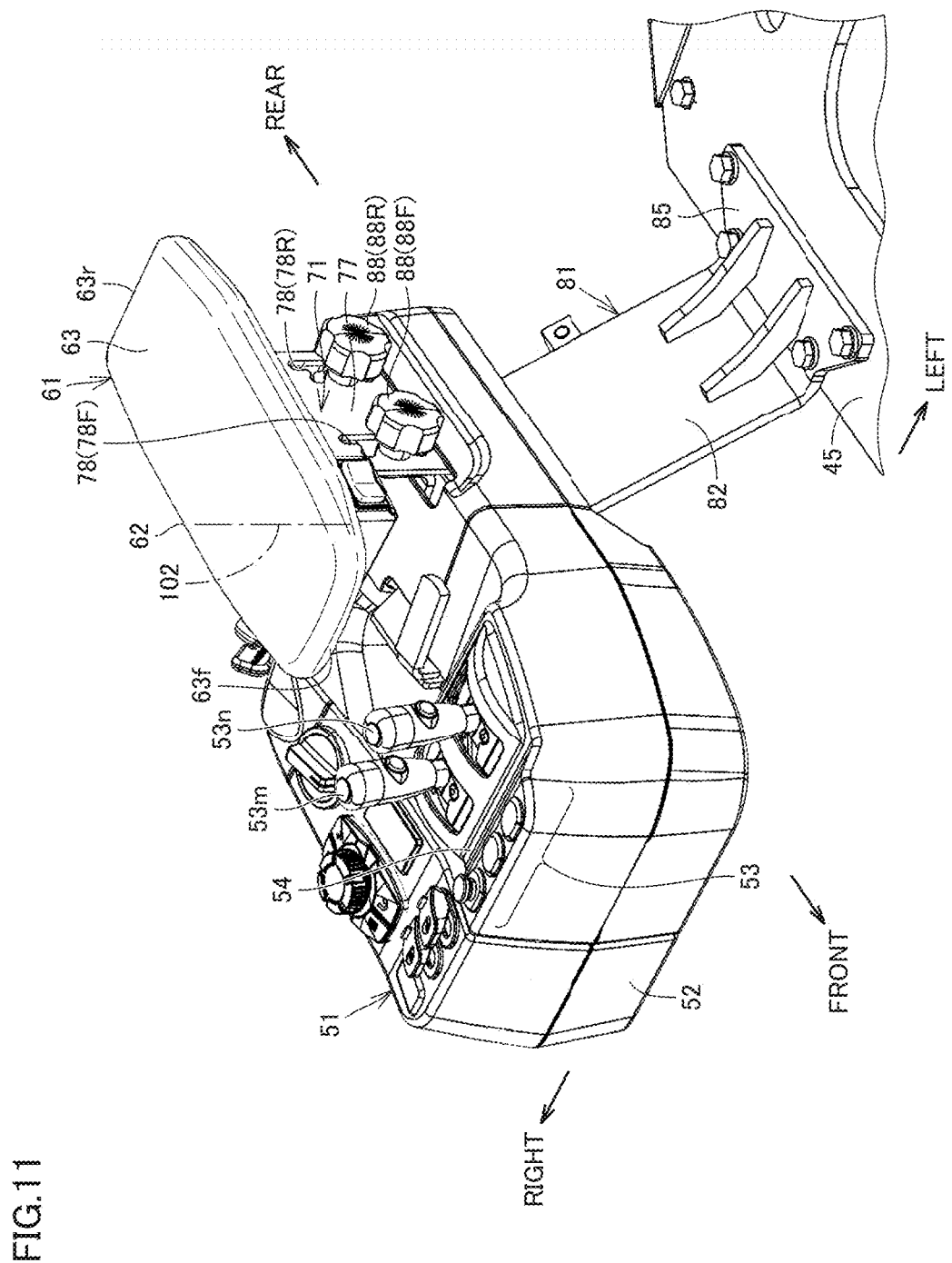
FIG. 11 is a perspective view showing a support structure for the console and the armrest.
Figure 12:
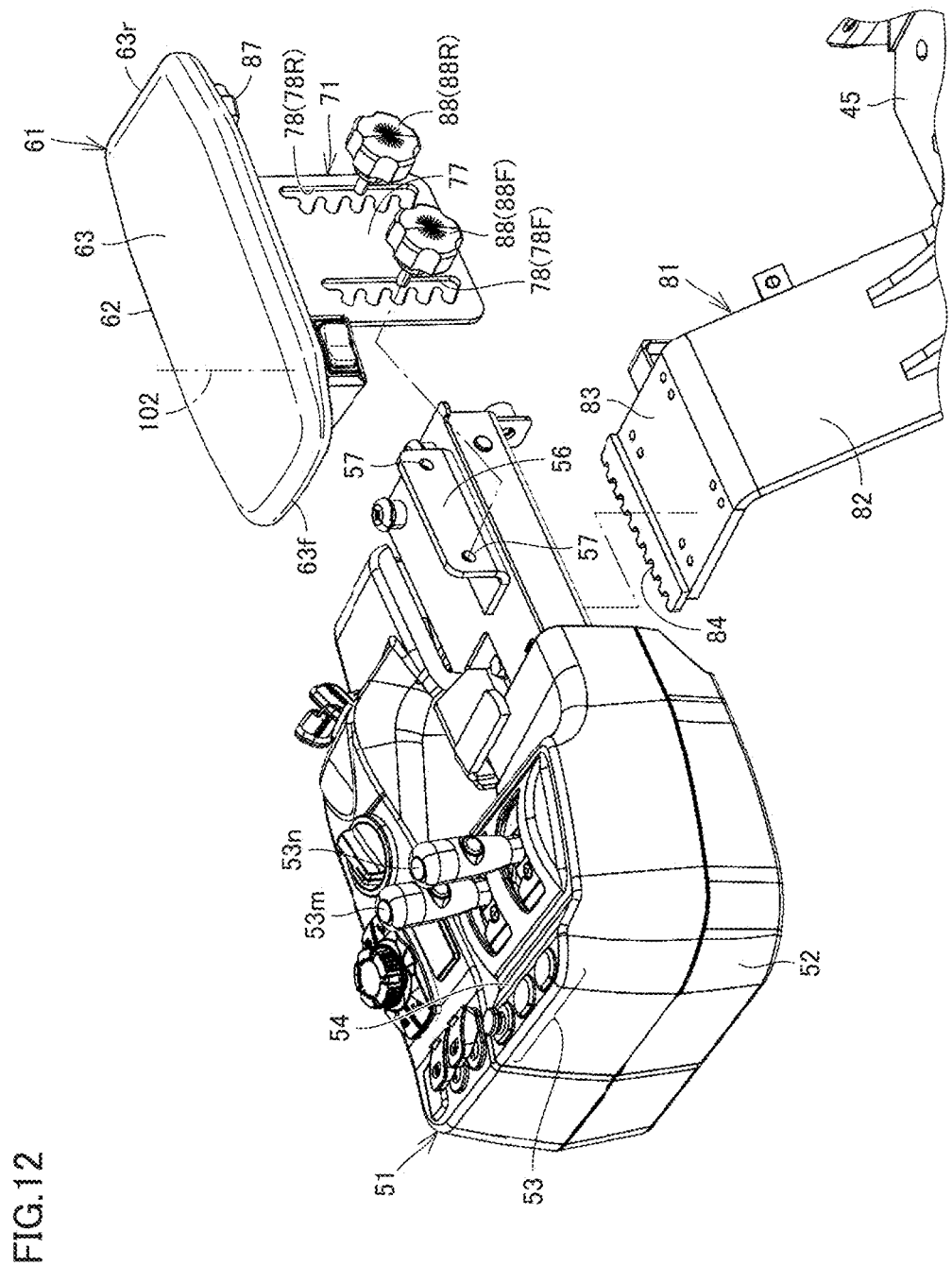
FIG. 12 is an exploded view showing the support structure for the console and the armrest.

In succession, a support structure for console 51 and armrest 61 will be described. FIG. 11 is a perspective view showing a support structure for the console and the armrest. FIG. 12 is an exploded view showing the support structure for the console and the armrest.

As shown in FIGS. 11 and 12, wheel loader 10 further includes an intermediate bracket 81. Console 51 is connected to support plate 45 with intermediate bracket 81 being interposed. Armrest 61 is connected to support plate 45 with console 51 and intermediate bracket 81 being interposed.

Intermediate bracket 81 includes a base end portion 85, an extending portion 82, a tip end portion 83, and a rack portion 84.

Base end portion 85 is in a shape of a flat plate and provided in parallel to the horizontal direction. Base end portion 85 is fastened to support plate 45. Extending portion 82 extends diagonally upward from base end portion 85 toward tip end portion 83. Extending portion 82 is provided as being laterally away from operator's seat 41 from base end portion 85 toward tip end portion 83. Tip end portion 83 is in a shape of a flat plate and provided in parallel to the horizontal direction. Console 51 is placed on tip end portion 83. Console 51 is supported on tip end portion 83 as being slidable in the fore/aft direction.

Rack portion 84 is provided at tip end portion 83. Rack portion 84 is constructed of teeth aligned along the fore/aft direction. Console 51 is provided with locking pins (not shown) to be engaged with rack portion 84. As the operator operates a fore/aft arrangement adjustment lever (not shown), the locking pins are released from rack portion 84. Positions of console 51 and armrest 61 attached to console 51 can thus be adjusted in the fore/aft direction.

As shown in FIGS. 10 to 12, bracket 71 is provided with a height adjustment groove 78 (78F and 78R). Height adjustment groove 78F and height adjustment groove 78R are provided at a distance from each other in the fore/aft direction. Height adjustment groove 78 is provided to pass through vertical plate portion 77 in a direction of thickness thereof.

Height adjustment groove 78 includes a vertical groove 79 and a plurality of diagonal grooves 80. Vertical groove 79 extends linearly along the upward/downward direction. Diagonal groove 80 extends diagonally upward from vertical groove 79. The plurality of diagonal grooves 80 are provided at a distance from each other in the upward/downward direction. The plurality of diagonal grooves 80 are provided at regular intervals.

Console 51 further includes an attachment angle 56. Attachment angle 56 is provided in the rear of operation portion 53. Attachment angle 56 is provided with a plurality of female threads 57. The plurality of female threads 57 are provided at a distance from each other in the fore/aft direction, in conformity with a pitch between height adjustment groove 78F and height adjustment groove 78R.

Armrest 61 further includes a height adjustment knob 88 (88F and 88R). Bracket 71 (vertical plate portion 77) is superimposed on attachment angle 56 sideways. Height adjustment knob 88F is inserted sideways into height adjustment groove 78F (diagonal groove 80) provided in bracket 71 and further screwed into female thread 57 provided in attachment angle 56. Height adjustment knob 88R is inserted in height adjustment groove 78R (diagonal groove 80) provided in bracket 71 and further screwed into female thread 57 provided in attachment angle 56. Armrest 61 is thus fastened to console 51.

While height adjustment knob 88 is unfastened, height adjustment knob 88 can move among the plurality of diagonal grooves 80 through vertical groove 79. A height of armrest 61 (upper surface 63) can thus be adjusted. By inserting height adjustment knobs 88 into diagonal grooves 80 different in height between height adjustment groove 78F and height adjustment groove 78R, inclination of armrest 61 in the upward/downward direction can also be adjusted. While height adjustment knob 88 is fastened to attachment angle 56, movement of height adjustment knob 88 in height adjustment groove 78 is restricted. The adjusted height and inclination of armrest 61 in the upward/downward direction are thus fixed.

In wheel loader 10, the position of console 51 and armrest 61 in the fore/aft direction can be adjusted or the height of armrest 61 and inclination of armrest 61 in the upward/downward direction can be adjusted in conformity with physical build of the operator. The operator can thus take a further comfortable operation posture.

FIGS. 13 to 18 are side views showing various forms of use of the console and the armrest.

Figure 13:
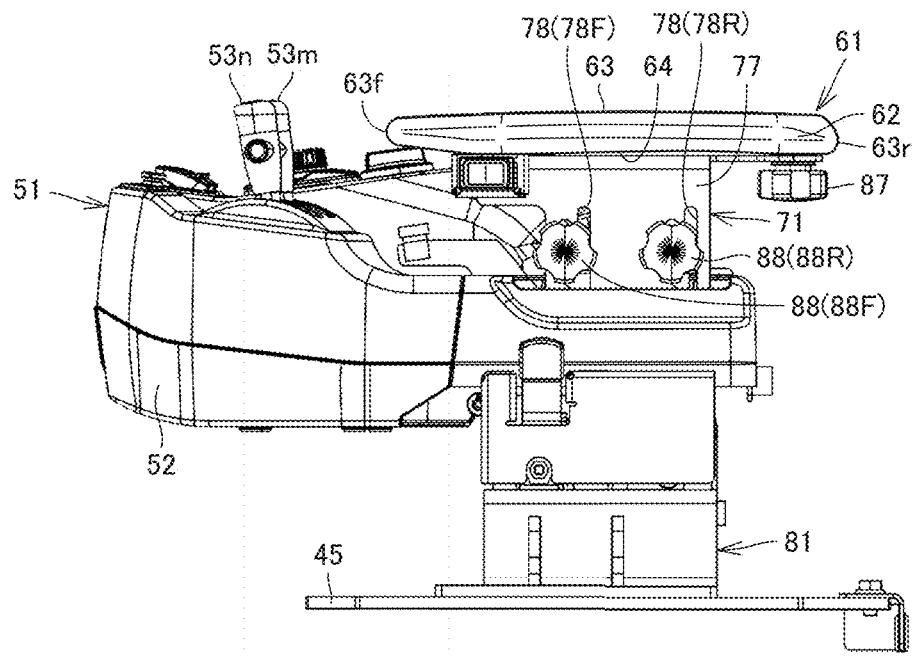
FIG. 13 is a side view showing a first form of use of the console and the armrest.
Figure 14:
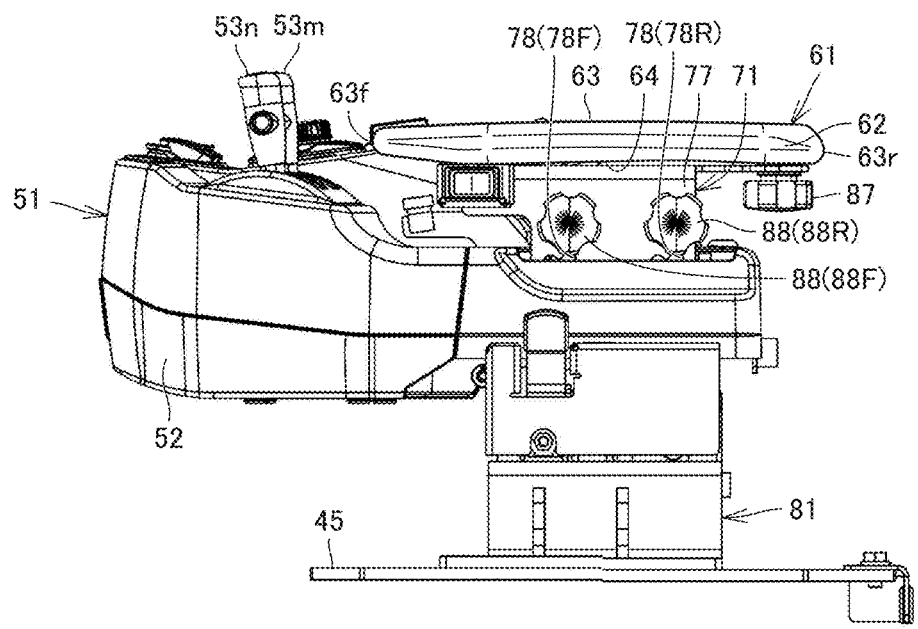
FIG. 14 is a side view showing a second form of use of the console and the armrest.
Figure 15:
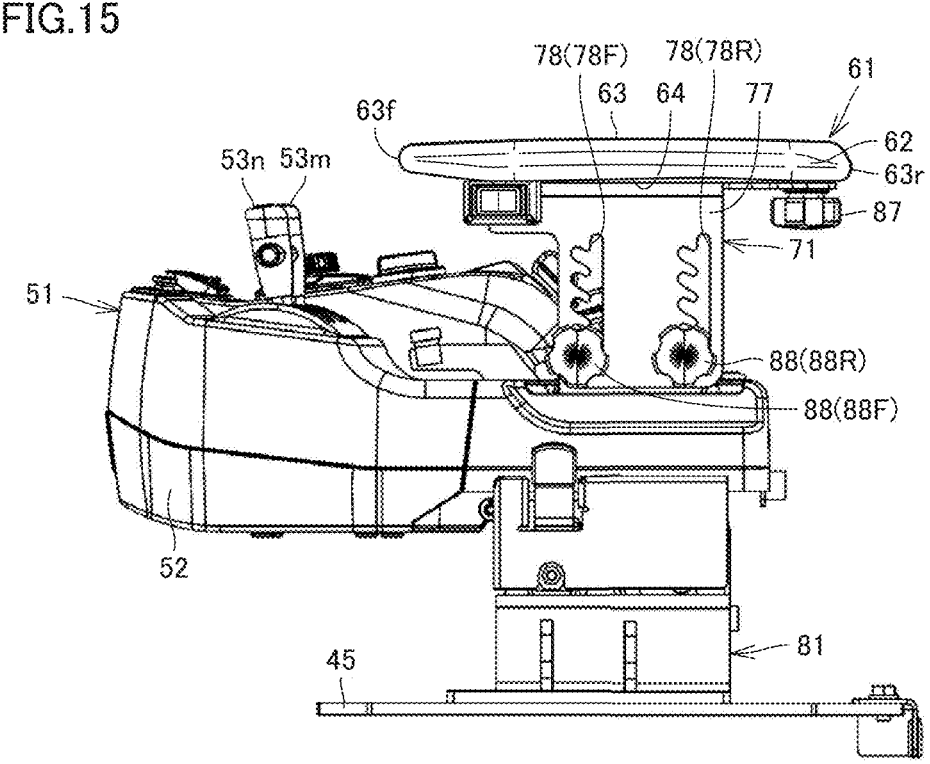
FIG. 15 is a side view showing a third form of use of the console and the armrest.

In FIG. 13, the height of armrest 61 is adjusted to an intermediate level. In FIG. 14, the height of armrest 61 is adjusted to a low level. In FIG. 15, the height of armrest 61 is adjusted to a high level.

Figure 16:
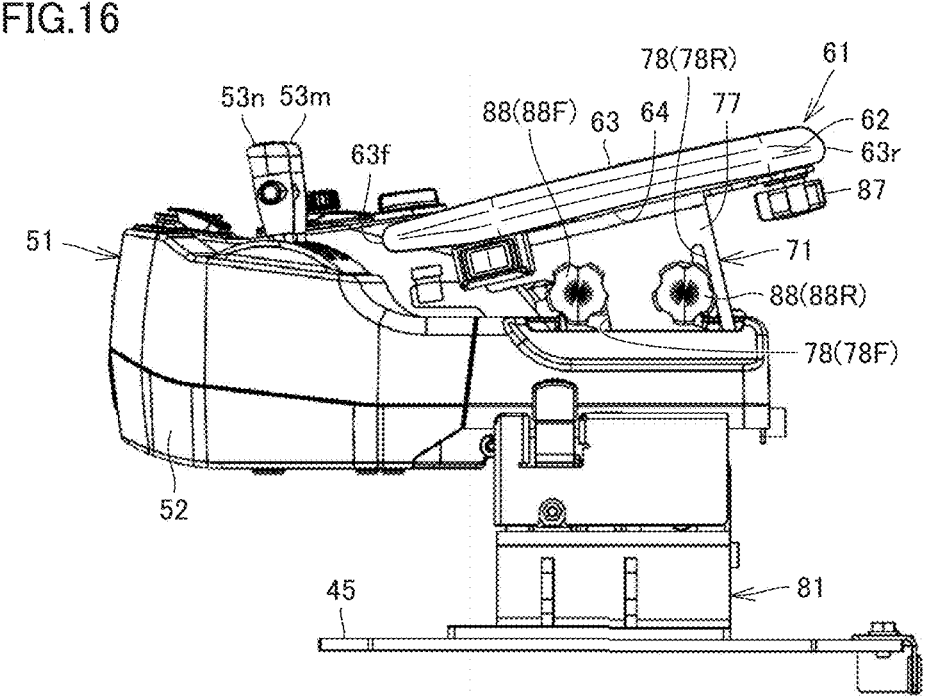
FIG. 16 is a side view showing a fourth form of use of the console and the armrest.
Figure 17:
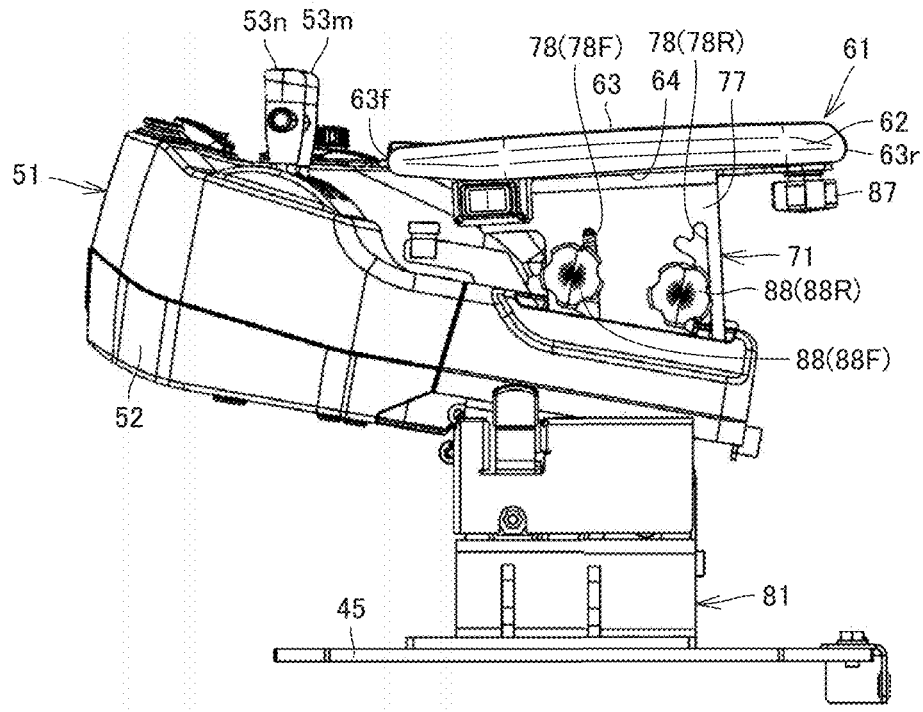
FIG. 17 is a side view showing a fifth form of use of the console and the armrest.
Figure 18:
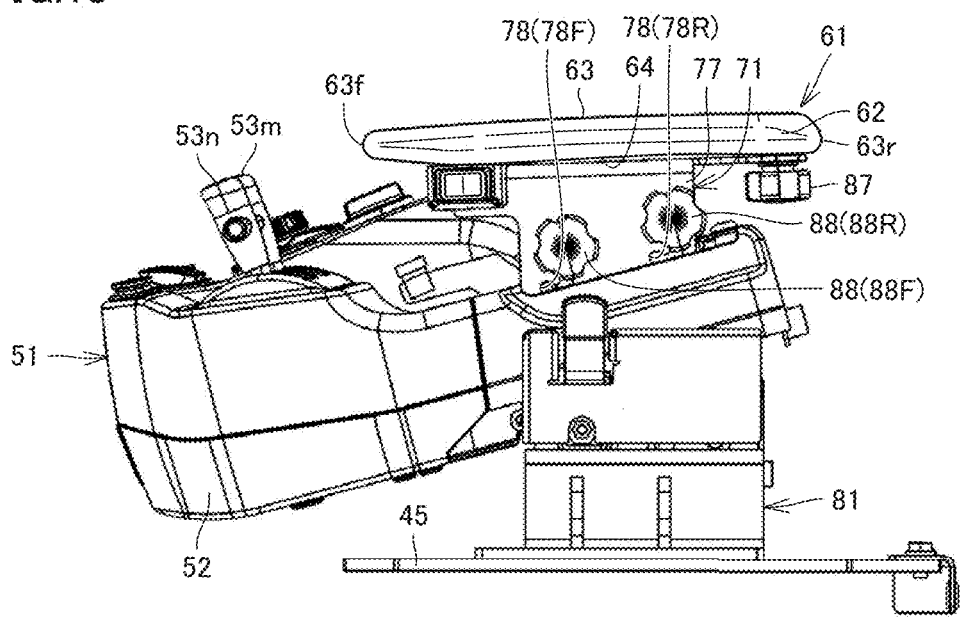
FIG. 18 is a side view showing a sixth form of use of the console and the armrest.

As shown in FIGS. 16 to 18, a tilt mechanism that allows adjustment of inclination of console 51 in the upward/downward direction may further be provided. In FIG. 16, console 51 is held in a horizontal posture whereas armrest 61 is adjusted to a lean forward posture (such a posture that the front end is located below the rear end). In FIG. 17, armrest 61 is held in the horizontal posture whereas console 51 is adjusted to a lean rearward posture (such a posture that the rear end is located below the front end). In FIG. 18, armrest 61 is held in the horizontal posture whereas console 51 is adjusted to the lean forward posture.

A construction and an effect of wheel loader 10 in the present embodiment will be summarized and described below.

Wheel loader 10 as the work vehicle includes operator's seat 41, console 51, and armrest 61. Console 51 includes operation portion 53. Console 51 is provided lateral to operator's seat 41. Armrest 61 includes upper surface 63. Armrest 61 is provided lateral to operator's seat 41 and in the rear of operation portion 53. Armrest 61 operates independently of console 51 such that rear end 63r of upper surface 63 is laterally displaced in the top view.

According to such a construction, the position of rear end 63r of upper surface 63 can laterally be adjusted in conformity with physical build of the operator. The operator can thus take a comfortable operation posture.

Armrest 61 pivots around pivot central axis 102 that intersects with upper surface 63. According to such a construction, armrest 61 that operates such that rear end 63r of upper surface 63 is laterally displaced in the top view can be realized with a simplified construction.

Pivot central axis 102 is located closer to front end 63f of upper surface 63 than to rear end 63r of upper surface 63 in the fore/aft direction.

Since the length of lateral displacement of rear end 63r is longer than the length of lateral displacement of front end 63f according to such a construction, a larger range within which the position of rear end 63r is adjusted can be set. Since the length of lateral displacement of front end 63f is shorter than the length of lateral displacement of rear end 63r, loss of relative positional relation between operation portion 53 and a position of the hand of the operator who operates operation portion 53 with adjustment of the position of rear end 63r can be suppressed.

The armrest includes cushion portion 62, boss portion 66, and bracket 71. Cushion portion 62 includes upper surface 63. Boss portion 66 protrudes downward from cushion portion 62 along pivot central axis 102. Bracket 71 supports cushion portion 62. Bracket 71 includes boss fitting portion 73. Boss fitting portion 73 is provided with hole 74 in which boss portion 66 is fitted.

According to such a construction, boss portion 66 protruding from cushion portion 62 along pivot central axis 102 is constrained by boss fitting portion 73 over a prescribed range in the axial direction of pivot central axis 102. Therefore, wobbling of cushion portion 62 at the time of pivot can be prevented.

Console 61 further includes front portion 58. Front portion 58 is provided in front of armrest 61. Front portion 58 is provided such that a lateral distance from centerline 101 of operator's seat 41 that extends in the fore/aft direction to front portion 58 increases from the rear toward the front in the top view.

According to such a construction, a wide space can be secured between the leg of the operator who sits in operator's seat 41 and console 51. Even though the operator of large build, the operator can thus take a comfortable operation posture.

The present disclosure is applied to various work vehicles including an armrest, without being limited to the wheel loader.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

INDUSTRIAL APPLICABILITY

The present disclosure is applied to a work vehicle.

REFERENCE SIGNS LIST 10 wheel loader; 12 front frame; 14 rear frame; 16 work implement; 17 engine hood; 21 boom; 22 bell crank; 23 link; 24 bucket; 25 boom cylinder; 26 bucket cylinder; 27 front wheel; 28 rear wheel; 30 cab; 32 door; 41 operator's seat; 42 seat back; 43 seat cushion; 45 support plate; 46 suspension mechanism; 51 console; 52 housing portion; 53 operation portion; 53m, 53n control lever; 54 upper surface; 56 attachment angle; 57, 67, 69 female thread; 58 front portion; 61 armrest; 62 cushion portion; 63 upper surface; 63f front end; 63r rear end; 64 lower surface; 66 boss portion; 68 fastened member; 71 bracket; 72 lateral plate portion; 73 boss fitting portion; 74 hole; 75 elongated hole; 77 vertical plate portion; 78, 78F, 78R height adjustment groove; 79 vertical groove; 80 diagonal groove; 81 intermediate bracket; 82 extending portion; 83 tip end; 84 rack portion; 85 base end; 86 bolt; 87 lateral arrangement adjustment knob; 88, 88F, 88R height adjustment knob; 91 collar; 93 flange; 96 plate; 101 centerline; 102 pivot central axis

The invention claimed is:

1. A work vehicle comprising:
an operator's seat;
a console including a housing portion and an operation portion, the console being provided lateral to the operator's seat; and
an armrest including an upper surface, the armrest being provided lateral to the operator's seat and in a rear of the operation portion, wherein
the armrest operating independently of the console such that a rear end of the upper surface is laterally displaced in a top view,
the armrest includes:
a cushion portion including the upper surface,
a boss portion protruding downward from the cushion portion along a pivot central axis,
a bracket attached to and supporting the cushion portion, and
a fastened member provided rear of the pivot central axis,
the bracket has a lateral plate portion,
the lateral plate portion is a flat plate having an elongated shape and extending in a fore/aft direction, and the lateral plate portion is arranged outside the housing portion,
the lateral plate portion has a boss fitting portion provided with a hole in which the boss portion is fitted,
the lateral plate portion has an elongated hole that extends laterally, and
when the fastened member is fastened to the lateral plate portion of the bracket through the elongated hole, movement of the cushion portion is restricted.

2. The work vehicle according to claim 1, wherein
the armrest pivots around the pivot central axis that intersects with the upper surface.

3. The work vehicle according to claim 2, wherein
the pivot central axis is located closer to a front end of the upper surface than to the rear end of the upper surface in the fore/aft direction.

4. The work vehicle according to claim 1, wherein
the console further includes a front portion provided in front of the armrest, and
the front portion is provided such that a lateral distance from a centerline of the operator's seat that extends in the fore/aft direction to the front portion increases from a rear side toward a front side in the top view.

* * * * *